United States Patent
Tachtler et al.

(10) Patent No.: US 10,505,405 B2
(45) Date of Patent: Dec. 10, 2019

(54) ELECTRIC MACHINE HAVING A ROTOR WITH FIRST AND SECOND PERMANENT MAGNETS IN DIFFERENT REGIONS WITH DIFFERENT TEMPERATURE RANGES

(71) Applicant: Bayerische Motoren Werke Aktiengesellschaft, Munich (DE)

(72) Inventors: Joachim Tachtler, Ismaning (DE); Dieter Ziegltrum, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 751 days.

(21) Appl. No.: 15/177,750

(22) Filed: Jun. 9, 2016

(65) Prior Publication Data

US 2016/0285322 A1    Sep. 29, 2016

Related U.S. Application Data

(63) Continuation of application No. PCT/EP2014/075642, filed on Nov. 26, 2014.

(30) Foreign Application Priority Data

Dec. 10, 2013   (DE) ......................... 10 2013 225 396

(51) Int. Cl.
*H02K 1/27*   (2006.01)
*H02K 1/02*   (2006.01)
(Continued)

(52) U.S. Cl.
CPC ................. *H02K 1/02* (2013.01); *H02K 1/27* (2013.01); *H02K 1/2706* (2013.01); *H02K 21/12* (2013.01); *H02K 21/14* (2013.01)

(58) Field of Classification Search
CPC .......... H02K 1/02; H02K 1/27; H02K 1/2706; H02K 21/12; H02K 21/14; H02K 1/2713;
(Continued)

(56) References Cited

U.S. PATENT DOCUMENTS 6,387,294 B1 * 5/2002 Yamashita ............ H01F 1/0578
                                                         252/62.54
8,334,667 B2 * 12/2012 Sakai ................... H02K 1/2766
                                                         318/494
(Continued)

FOREIGN PATENT DOCUMENTS

CN        101047325 A    10/2007
CN        102064622 A     5/2011
(Continued)

OTHER PUBLICATIONS https_web.archive.org_web_20101206031754_http_www.mmgca.com_apps_MMG-magtempvar.pdf dating 2010.*
(Continued)

*Primary Examiner* — Mang Tin Bik Lian
*Assistant Examiner* — Maged M Almawri
(74) *Attorney, Agent, or Firm* — Crowell & Moring LLP

(57) ABSTRACT

An electric machine is provided having at least one first permanent magnet, at least one second permanent magnet, a first region, the temperature of which is in a first temperature range during operation, and a second region, the temperature of which is in a second temperature range during operation. The at least one second permanent magnet has a higher maximum working temperature than the first permanent magnet, wherein the maximum working temperature is below the temperature at which the magnetic field strength of the permanent magnet irreversibly decreases in dependence on temperature and because of a magnetic field applied externally to the permanent magnet from. The first permanent magnet is arranged in the first region and the second permanent magnet is arranged in the second region.

14 Claims, 2 Drawing Sheets

(51) Int. Cl.
*H02K 21/12* (2006.01)
*H02K 21/14* (2006.01)

(58) Field of Classification Search
CPC .... H02K 1/272; H02K 1/1726; H02K 1/2733; H02K 1/274; H02K 1/2746; H02K 1/276; H02K 1/2766; H02K 1/2753
USPC .................................. 310/156.01–156.57
See application file for complete search history.

(56) References Cited

U.S. PATENT DOCUMENTS

| | | | | |
|---|---|---|---|---|
| 2007/0096578 | A1* | 5/2007 | Jahns | H02K 1/2766 310/156.53 |
| 2007/0228862 | A1 | 10/2007 | Welchko et al. | |
| 2007/0284960 | A1* | 12/2007 | Fulton | H02K 1/2766 310/156.53 |
| 2008/0303368 | A1* | 12/2008 | Rahman | H02K 1/276 310/156.56 |
| 2010/0019600 | A1* | 1/2010 | Saban | H02K 1/02 310/156.27 |
| 2010/0079024 | A1* | 4/2010 | Komuro | H02K 1/02 310/156.01 |
| 2011/0080066 | A1* | 4/2011 | Doi | H02K 1/276 310/156.43 |
| 2011/0198959 | A1* | 8/2011 | Vyas | B60L 50/51 310/156.21 |
| 2012/0080972 | A1* | 4/2012 | Kanada | H01F 1/086 310/156.43 |
| 2012/0105930 | A1* | 5/2012 | Yamamoto | G02B 26/105 359/199.3 |
| 2012/0242182 | A1* | 9/2012 | Yabe | H02K 1/276 310/156.53 |
| 2012/0262020 | A1* | 10/2012 | Smith | H02K 1/2766 310/156.07 |
| 2012/0299408 | A1* | 11/2012 | Higuchi | H02K 1/2793 310/63 |
| 2013/0049910 | A1* | 2/2013 | Tanaka | B60L 50/61 335/302 |
| 2013/0113325 | A1* | 5/2013 | Saito | H02K 1/2706 310/156.12 |
| 2013/0127280 | A1* | 5/2013 | Sugimoto | H02K 1/2766 310/156.01 |
| 2013/0162089 | A1* | 6/2013 | Komuro | H02K 1/02 310/156.01 |
| 2013/0169098 | A1* | 7/2013 | Chamberlin | H02K 1/272 310/156.08 |
| 2013/0221784 | A1* | 8/2013 | Kori | H02K 1/27 310/90 |
| 2013/0241340 | A1* | 9/2013 | Koga | H02K 1/2773 310/156.56 |
| 2013/0270949 | A1* | 10/2013 | Gracia | H02K 1/02 310/152 |
| 2013/0270956 | A1* | 10/2013 | Yamaguchi | H02K 1/27 310/156.27 |
| 2013/0313938 | A1* | 11/2013 | Yamada | H02K 1/2713 310/156.69 |
| 2014/0054986 | A1* | 2/2014 | Hirai | H02K 9/19 310/53 |
| 2015/0001980 | A1* | 1/2015 | Zhang | H02K 21/16 310/156.43 |
| 2015/0280500 | A1* | 10/2015 | Nigo | H02K 21/16 310/156.53 |
| 2016/0043615 | A1* | 2/2016 | Kayano | H02K 1/27 310/68 B |

FOREIGN PATENT DOCUMENTS

| | | |
|---|---|---|
| CN | 202918134 U | 5/2013 |
| CN | 103187816 A | 7/2013 |
| CN | 103326486 A | 9/2013 |
| EP | 2 611 002 A2 | 3/2013 |
| JP | 8-340651 A | 12/1996 |
| JP | 2010-213516 A | 9/2010 |
| WO | WO 2011/154045 A1 | 12/2011 |

OTHER PUBLICATIONS

Curie_point_physics_Britannica.com.pdf.*
Temperature_effects_on_magnets.*
German Search Report issued in counterpart German Application No. 10 2013 225 396.6 dated Feb. 20, 2014.
Chinese-language Office Action issued in counterpart Chinese Application No. 201480052891.3 dated Apr. 4, 2018 with English translation (sixteen (16) pages).
Chinese-language Office Action issued in counterpart Chinese Application No. 201480052891.3 dated Aug. 1, 2017 with English translation (Sixteen (16) pages).
Torre, E. et al., "Temperature Variation of Magnetic Aftereffect", IEEE Transactions on Magnetics, May 31, 2001, pp. 1118-1122, vol. 37, Issue 3.
Ganchev, M. et al., "Sensorless Rotor Temperature Estimation of Permanent Magnet Synchronus Motor", IECON 2012—38th Annual Conference on IEEE Industrial Electronics Society, Oct. 25, 2012, pp. 2018-2023.
Chinese-language Office Action issued in counterpart Chinese Application No. 201480052891.3 dated Aug. 2, 2018 with English translation (18 pages).

* cited by examiner

ELECTRIC MACHINE HAVING A ROTOR WITH FIRST AND SECOND PERMANENT MAGNETS IN DIFFERENT REGIONS WITH DIFFERENT TEMPERATURE RANGES

CROSS REFERENCE TO RELATED APPLICATIONS

This application is a continuation of PCT International Application No. PCT/EP2014/075642, filed Nov. 26, 2014, which claims priority under 35 U.S.C. § 119 from German Patent Application No. 10 2013 225 396.6, filed Dec. 10, 2013, the entire disclosures of which are herein expressly incorporated by reference.

BACKGROUND AND SUMMARY OF THE INVENTION

The present invention relates to an electrical machine having a plurality of permanent magnets which are distributed in the electrical machine in an optimized manner. In particular, temperature profiles in the electrical machine are taken into account when distributing the permanent magnets.

In electric drives for passenger cars, for example hybrid vehicles or battery-operated vehicles, synchronous machines having permanent magnets (PSM: permanent-magnet synchronous machines) are predominantly used as electric motors. The magnets which are used in this case are mainly NdFeB magnets. These motors have a high torque at low rotation speeds and a very high degree of efficiency. Given an optimized arrangement of the magnets, a high power can be achieved over virtually the entire rotation speed range. The mass of the magnets used is up to several kilograms. A further field of application for permanent-magnet synchronous machines is wind generators. The mass of the magnets of a wind generator of this kind can be several 100 kg up to over 1000 kg.

The permanent magnets used in the prior art comprise alloys of metals which are called rare earth metals. Examples of metals of this kind include neodymium and praseodymium. The heavy rare earth metals dysprosium and terbium are also used. The costs of these magnets have risen greatly in recent years on account of the increased demand in the fields of electromobility and regenerative power generation. These magnets are fitted in electrical machines in a manner distributed either in the stator (external rotor) or rotor (internal rotor). NdFeB magnets are often used in the prior art since they have the highest flux density currently known. However, these magnets have the disadvantage that they cannot withstand an opposing magnetic field, which is applied from the outside, at high temperatures and are demagnetized under these conditions. During operation of an electrical machine, the conversion of electrical energy into mechanical energy or vice versa results in heat loss. As a result, the components of the electrical machine are heated. When a critical temperature of the magnets of more than approximately 80° C. is reached, the magnetic field strength of the magnets is successively and irreversibly lost.

In order to be able to operate an electrical machine over as high a limit temperature range as possible, to keep the expenditure on cooling low and to be able to withstand high continuous powers for as long as possible, the NdFeB magnets are alloyed with dysprosium and/or praseodymium. However, the cost of dysprosium and praseodymium is approximately ten times as high as that of neodymium.

The invention is based on the object of providing an electrical machine which firstly has temperature-resistant magnets and secondly reduces costs.

The electrical machine according to an embodiment of the invention comprises at least one first permanent magnet and at least one second permanent magnet. The electrical machine further comprises a first region, the temperature of said first region being in a first temperature range during operation, and a second region, the temperature of said second region being in a second temperature range during operation and the maximum operating temperature of said second region being higher than the maximum operating temperature in the first region. The at least one second permanent magnet has a higher maximum working temperature than the first permanent magnet. The maximum working temperature is below the temperature at which the magnetic field strength of the permanent magnet decreases irreversibly due to temperature and on account of a magnetic field which is applied to the permanent magnet from the outside. The first permanent magnet is arranged in the first region and the second permanent magnet is arranged in the second region.

An electrical machine within the meaning of the present invention can be both an electric motor and a generator.

According to the invention, the inventors of the present invention propose that the choice of materials for the permanent magnets takes into account the temperature distribution in the electrical machine. Therefore, magnets which are subjected to relatively high thermal loads are provided, for example are alloyed, with materials which are more resistant. The magnets which are subjected to relatively low thermal loads are provided, for example alloyed, with a lower proportion of material of relatively high magnetic quality.

The magnetic field strength of a permanent magnet decreases irreversibly depending on the working temperature and a magnetic field, which is applied to the permanent magnet from the outside, when limit values are exceeded, wherein the magnetic field can be generated by a winding (solenoid) of the electrical machine. The magnetic field which is generated by the solenoid can be directed oppositely to the magnetic field of a permanent magnet. In the case of a high field strength, which is applied from the outside, in the permanent magnet, it is necessary to maintain a relatively low working temperature in order to not damage the permanent magnet. The field strength in machines which are severely stressed (torque and/or volume) is generally larger than in the case of machines which are less severely stressed. A 5% field strength is usually always specified for a specific working temperature (HD05). This means that, when the field strength, which is applied from the outside, in the magnet reaches this value, the magnet loses 5% of its remanence flux density. It therefore becomes 5% weaker. The further the external field strength surpasses the field strength HD05, the greater the damage. This damage occurs immediately after the field strength is exceeded once. This is not an ageing effect.

The maximum working temperature can be at least 5° C., preferably at least 10° C., more preferably at least 15° C., extremely preferably at least 20° C., most preferably at least 25° C., below the temperature at which the magnetic field strength of the permanent magnet decreases irreversibly due to temperature. The temperature at which the magnetic field strength of the permanent magnet decreases irreversibly due to temperature can be the temperature at which the macroscopic orientation of the Weiss domains of a permanent magnet is lost on account of a magnetic field which is applied to the at least one permanent magnet from the outside. The magnetic field strength of the permanent magnet can be generated by the remanence flux density. The magnetic field which is applied from the outside can be generated by a stator winding or by other solenoids. The physical principles relating to permanent magnets are known to a person skilled in the art and do not need to be explained further in this document for reasons of conciseness.

The maximum working temperature of the at least one solenoid and a maximum field strength of the magnetic field which is applied to the at least one permanent magnet from the outside can be at least 5%, preferably at least 10%, more preferably at least 20%, below the values at which the magnetic field strength or remanence flux density of the permanent magnet decreases irreversibly due to temperature.

The second permanent magnet can contain a higher proportion of dysprosium, praseodymium, terbium and/or samarium cobalt than the first permanent magnet. Magnets which are subjected to relatively high thermal loads are alloyed with a higher proportion of dysprosium (Dy) and/or terbium (Tb) and/or praseodymium and/or samarium cobalt than the magnets which are subjected to relatively low thermal loads. Therefore, the costs of the magnets and of the electrical machine overall are reduced by using higher-quality and more expensive magnet materials for the individual permanent magnets in a region of the electrical machine which is subjected to relatively high thermal loads and by using lower-quality and therefore more cost-effective materials in a region of the electrical machine which is subjected to relatively low thermal loads.

The first region and/or the second region can be located in the rotor. The second region can be located closer to the axis of the rotor in the radial direction than the first region. This design is based on the knowledge that a higher temperature prevails in the interior of the rotor than in the edge regions of the rotor.

The rotor can be of substantially cylindrical design, that is to say the outer contour of the rotor can be substantially cylindrical. Given this design, the first region can be located closer to the base surface of the cylindrical rotor than the second region. The first region can be located closer to the edge of the rotor than the second region, for example both in the radial direction and in the axial direction.

The at least one first permanent magnet and the at least one second permanent magnet can be arranged at least partially on an electrical sheet.

The electrical machine can be a synchronous machine. The electrical machine can be a generator and/or a motor.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
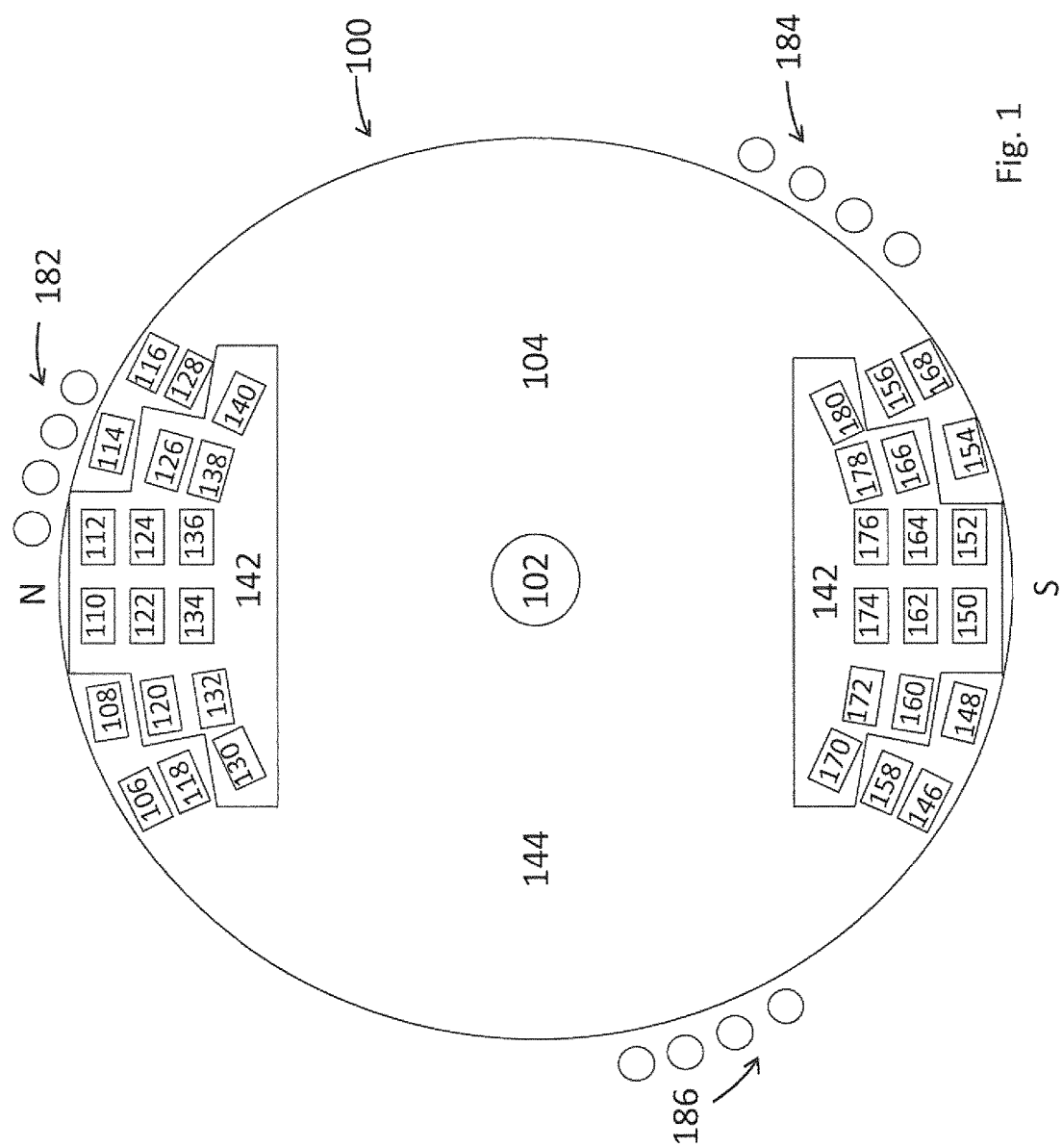
FIG. 1 is a simplified section through a rotor of an electrical machine according to an embodiment of the invention.
Figure 2:
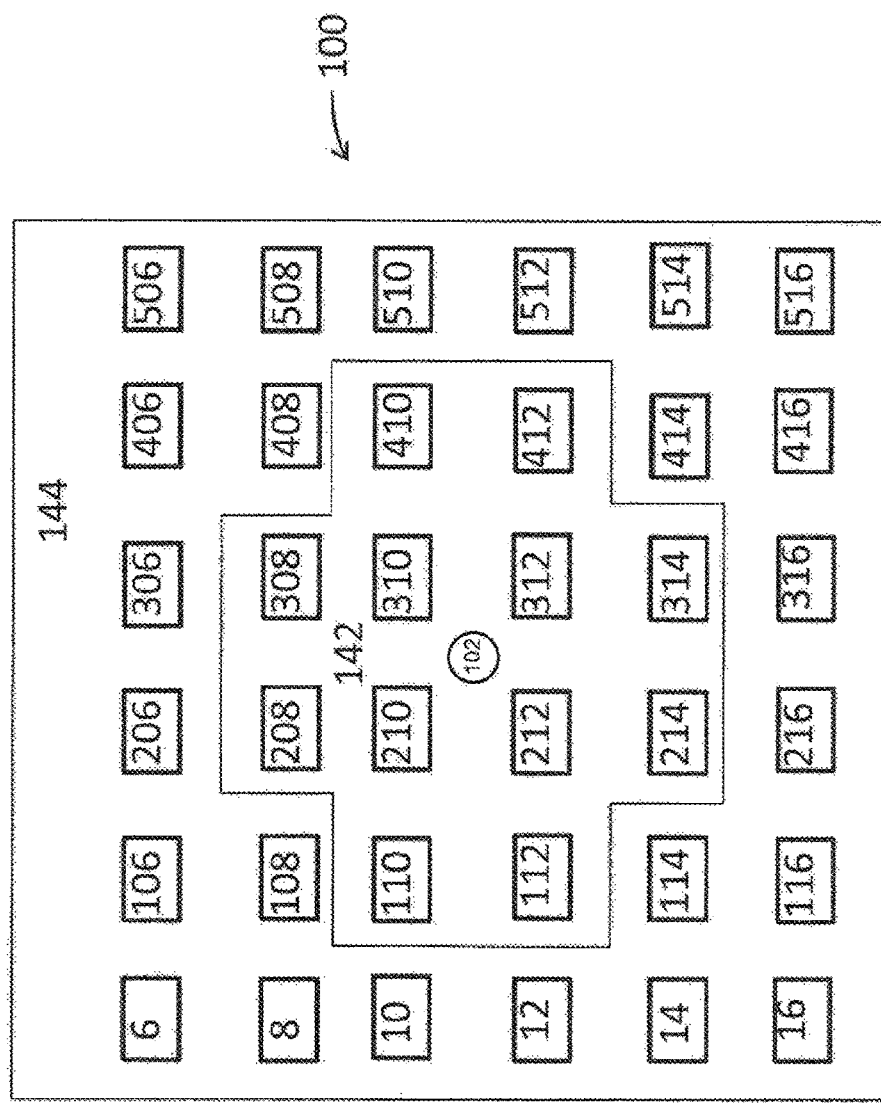
FIG. 2 is a simplified plan view of a rotor of an electrical machine according to an embodiment of the invention.

FIGS. 1 and 2 show an exemplary temperature distribution in an electrical machine. It goes without saying that the temperature distribution can differ on account of the rotation speed of the rotor or of the cooling mechanism. If the rotor is cooled by means of the shaft, this can result in a temperature distribution which differs from the temperature distribution shown in FIGS. 1 and 2.

Reference is made to FIG. 1 which shows a section through an electrical machine, such as a synchronous machine, according to an embodiment of the invention. The electrical machine can operate both as a motor and as a generator. The electrical machine has a rotor 100 which is mounted on a shaft 102. The electrical machine further has three stator windings 182, 184, 186. A rotating field which is generated by way of a three-phase alternating current is applied to the stator windings 182, 184, 186. The manner of operation of the synchronous machine shown in FIG. 1 is known to a person skilled in the art and therefore the synchronous machine does not need to be explained in any further detail for reasons of conciseness. The stator windings 182, 184, 186 each form a solenoid.

A plurality of magnets 106-140, 146-180 is arranged in an electrical sheet 104 which is mounted on the shaft 102. The magnets 106-140, 146-180 are arranged such that the north pole of the magnets is directed upward and the south pole is directed downward in the illustration shown in FIG. 1.

The rotor has a first region 144 which has a relatively low thermal loading, and a second region 142 which has a relatively high thermal loading. The maximum operating temperature in the second region is higher than the maximum operating temperature in the first region. The magnets 106, 108, 114, 116, 118, 128, 146, 148, 154, 156, 158, 168, which are arranged in the first region 144, have a lower maximum working temperature than those magnets 110, 112, 120, 122, 124, 126, 130, 132, 134, 136, 138, 140, 150, 152, 160, 162, 164, 166, 170, 172, 174, 176, 178, 180 which are arranged in the second region 142.

The maximum working temperature of the magnets is below a temperature at which the magnetic field strength of the permanent magnet decreases irreversibly due to temperature and on account of the magnetic field which is generated by the solenoids 182, 184, 186. The temperature at which the magnetic field strength of the permanent magnets decreases irreversibly due to temperature can be the temperature at which the macroscopic orientation of the Weiss domains of a permanent magnet is lost on account of a magnetic field which is generated by the solenoids 182, 184, 186. The maximum working temperature of the at least one permanent magnet and a maximum field strength of the magnetic field which is generated by the at least one solenoid on the at least one permanent magnet can be at least 5%, preferably at least 10%, more preferably at least 20%, below the values at which the magnetic field strength of the permanent magnet decreases irreversibly due to temperature. The magnets in the second region 142 can contain a higher proportion of dysprosium, praseodymium, terbium and/or samarium cobalt than the magnets in the first region 144.

The maximum working temperature can be at least 5° C., preferably at least 10° C., more preferably at least 15° C., extremely preferably at least 20° C., most preferably at least 25° C., below the temperature at which the magnetic field strength of the permanent magnet decreases irreversibly due to temperature and/or on account of a magnetic field which is applied to the permanent magnet from the outside.

FIG. 1 shows that a plurality of layers of magnets are arranged in the radial direction. The closer the layer of magnets to the center of the rotor, the more magnets there are in the second region 142 which is subjected to more severe thermal loading. The first layer, which is at the furthest radial distance from the center, contains the magnets 106, 108, 110, 112, 114, 116 and 146, 148, 150, 152, 154, 168. The magnets 106, 108, 114, 116, 146, 148, 154, 168 are located in the first region 144 which is subjected to relatively low thermal loading, while the magnets 110, 112, 150, 152 are located in the second region 142 which is subjected to relatively high thermal loading.

The second layer comprises the magnets 118, 120, 122, 124, 126, 128 and 158, 160, 162, 164, 166, 156. The first region 144 contains only the magnets 118, 128, 158, 156. The second region 142 contains the magnets 120, 122, 124, 126, 160, 162, 164, 166. Therefore, the second layer, which is arranged closer to the center of rotation of the rotor, contains more magnets in the second region 142 than the first layer which is further away from the center of rotation of the rotor than the second layer.

The third layer, which is located closer to the center of rotation of the rotor than the second layer, contains all of the magnets 130, 132, 134, 136, 138, 140, 170, 172, 174, 176, 178, 180 in the second region 142.

FIG. 2 shows a plan view of a rotor 100 of the present invention. FIG. 2 shows a plan view of a magnet arrangement which forms the north pole of the rotor. The illustration in FIG. 2 shows the topmost layer, that is to say the first layer, of magnets. In the illustration shown in FIG. 2, the magnets are arranged in rows and columns. The second column from the left comprises the magnets 106, 108, 110, 112, 114, 116 which are shown in section in FIG. 1.

The closer the rows and/or the columns to the edge of the rotor, the more magnets there are in the first region 144 and the fewer magnets there are in the second region 142. The outermost rows contain all of the magnets 6, 106, 206, 306, 406, 506, 16, 116, 216, 316, 416, 516 in the first region 144. The second outermost row contains some of the magnets 8, 108, 408, 508, 14, 114, 414, 514 in the first region 144. The magnets 208, 308, 214, 314 of the second outermost row are located in the second region 142.

The inner rows which are furthest away from the edge of the magnet arrangement on the cylindrical surface of the rotor 100 contain the magnets 10, 510, 12, 512 in the first region 144, and the magnets 110, 210, 310, 410, 112, 212, 312, 412 in the second region 142.

The further away a row of magnets is from the edge of the magnet arrangement, the more magnets there are in the second region. The magnet arrangement is located on an imaginary cylindrical casing, wherein the axis of the cylindrical casing coincides with the rotation axis of the rotor 100.

The outer columns of the above-described magnet arrangement on an arbitrary imaginary cylindrical casing of the rotor 100 contain the outer magnets 6, 8, 10, 12, 14, 16, 506, 508, 510, 512, 514, 516 all in the first region 144. The second outermost columns contain the magnets 106, 108, 114, 116, 406, 408, 414, 416 in the first region 144 and the magnets 110, 112, 410, 412 in the second region 142. The inner columns, which are arranged furthest away from the edge of the magnet arrangement of an arbitrary imaginary cylindrical casing around the rotation axis of the rotor 100, contain the magnets 206, 216, 306, 316 in the first region 144 and the magnets 208, 210, 212, 214, 308, 310, 312, 314 in the first region 142. The further away a row of the magnet arrangement on an arbitrary imaginary cylindrical casing around the rotation axis of the rotor 100 is from the edge of the respective magnet arrangement, the more magnets there are in the second region 142 and the fewer magnets there are in the first region 144.

The present invention has the advantage that the electrical machine can be produced from a plurality of discrete magnets and magnets with relatively rare and/or costly raw materials have to be used only in regions which are subject to high thermal loading. As a result, firstly the service life of the electrical machine is increased and secondly the costs of production are reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical machine, comprising:
   at least one first permanent magnet including a plurality of first permanent magnets;
   at least one second permanent magnet including a plurality of second permanent magnets;
   a first region of the electrical machine, wherein a temperature of the first region is in a first temperature range during operation; and
   a second region of the electrical machine, wherein:
   a temperature of the second region is in a second temperature range during operation and a maximum operating temperature of the second region is higher than a maximum operating temperature of the first region,
   the at least one second permanent magnet has a higher maximum working temperature than the first permanent magnet, wherein the maximum working temperature is below a temperature at which a magnetic field strength of the at least one second permanent magnet decreases irreversibly due to temperature and on account of a magnetic field applied externally to the at least one second permanent magnet, and
   the at least one first permanent magnet is arranged in the first region and the at least one second permanent magnet is arranged in the second region of the electrical machine, and
   the plurality of second permanent magnets are arranged in a pyramid shape in which a base of the pyramid shape is closer to a rotation axis of the electrical machine than a top of the pyramid shape, and the plurality of first permanent magnets are arranged between the pyramid shape and an outer periphery of a rotor of the electrical machine.

2. The electrical machine according to claim 1, wherein the temperature at which the magnetic field strength of the at least one second permanent magnet decreases irreversibly due to temperature is a temperature at which a macroscopic orientation of Weiss domains is lost on account of a magnetic field externally applied to the at least one second permanent magnet.

3. The electrical machine according to claim 1, wherein:
   the maximum working temperature is at least 15° C. below the temperature at which the magnetic field strength of the at least one second permanent magnet decreases irreversibly due to temperature, and/or
   the maximum working temperature of the at least one second permanent magnet and a maximum field strength of the magnetic field applied externally to the at least one second permanent magnet is at least 10% below values at which the magnetic field strength of the at least one second permanent magnet decreases irreversibly due to temperature.

4. The electrical machine according to claim 1, wherein:
the maximum working temperature is at least 25° C. below the temperature at which the magnetic field strength of the at least one second permanent magnet decreases irreversibly due to temperature, and/or
the maximum working temperature of the at least one second permanent magnet and a maximum field strength of the magnetic field applied externally to the at least one second permanent magnet is at least 20% below values at which the magnetic field strength of the at least one second permanent magnet decreases irreversibly due to temperature.

5. The electrical machine according to claim 1, wherein the at least one second permanent magnet has a higher proportion of:
dysprosium;
praseodymium;
terbium; and/or
samarium cobalt,
than the first permanent magnet.

6. The electrical machine according to claim 1, further comprising an electrical sheet on which the at least one first permanent magnet and the at least one second permanent magnet are at least partially arranged.

7. The electrical machine according to claim 1, wherein the electrical machine is a synchronous machine.

8. The electrical machine according to claim 1, wherein the electrical machine is a generator and/or motor.

9. The electrical machine according to claim 1, wherein:
the maximum working temperature is at least 5° C. below the temperature at which the magnetic field strength of the at least one second permanent magnet decreases irreversibly due to temperature, and/or
the maximum working temperature of the at least one second permanent magnet and a maximum field strength of the magnetic field applied externally to the at least one second permanent magnet is at least 5% below values at which the magnetic field strength of the at least one second permanent magnet decreases irreversibly due to temperature.

10. The electrical machine according to claim 9, wherein the at least one second permanent magnet has a higher proportion of:
dysprosium;
praseodymium;
terbium; and/or
samarium cobalt,
than the first permanent magnet.

11. The electrical machine according to claim 1, wherein at least one of the first region and the second region are located in the rotor of the electrical machine.

12. The electrical machine according to claim 11, wherein the rotor has a substantially cylindrical configuration, and wherein the first region is located closer to a base surface and/or to an edge of the cylindrically configured rotor than the second region.

13. The electrical machine according to claim 11, wherein the second region is located closer to an axis of the rotor in a radial direction than the first region.

14. The electrical machine according to claim 13, wherein the rotor has a substantially cylindrical configuration, and wherein the first region is located closer to a base surface and/or to an edge of the cylindrically configured rotor than the second region.

* * * * *